(12) United States Patent
Neuberger et al.

(10) Patent No.: US 9,476,506 B2
(45) Date of Patent: Oct. 25, 2016

(54) SLIDE RING SEAL

(71) Applicant: CARL FREUDENBERG KG, Weinheim (DE)

(72) Inventors: Soeren Neuberger, Hockenheim (DE); Eberhard Bock, Moerlenbach (DE); Alexander Guentert, Heidelberg (DE); Klaus Lang, Eurasburg (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/785,865

(22) PCT Filed: Apr. 8, 2014

(86) PCT No.: PCT/EP2014/000936
§ 371 (c)(1),
(2) Date: Oct. 21, 2015

(87) PCT Pub. No.: WO2014/173495
PCT Pub. Date: Oct. 30, 2014

(65) Prior Publication Data
US 2016/0084383 A1    Mar. 24, 2016

(30) Foreign Application Priority Data
Apr. 22, 2013   (DE) .................. 10 2013 006 840
Jul. 11, 2013   (WO) ............. PCT/EP2013/002050

(51) Int. Cl.
*F16J 15/36*   (2006.01)
*F16J 15/34*   (2006.01)

(52) U.S. Cl.
CPC ........... *F16J 15/3452* (2013.01); *F16J 15/348* (2013.01); *F16J 15/36* (2013.01)

(58) Field of Classification Search
CPC .... F16J 15/34; F16J 15/3408; F16J 15/3412; F16J 15/3428; F16J 15/3436; F16J 15/344; F16J 15/3452; F16J 15/36
See application file for complete search history.

(56) References Cited

U.S. PATENT DOCUMENTS 4,275,889 A * 6/1981 Butler .................. F16J 15/36
                                            277/375
5,013,051 A * 5/1991 Hilaris .................. F16J 15/36
                                            277/379

(Continued)

FOREIGN PATENT DOCUMENTS

DE       19914929 A1    10/2000
DE       69628591 T2     4/2004

(Continued)

*Primary Examiner* — Gilbert Lee
(74) *Attorney, Agent, or Firm* — Leydig, Voit & Mayer, Ltd.

(57) ABSTRACT

A slide ring seal has a slide ring, supported such that the slide ring is axially movable, and a counter ring. The slide ring and the counter ring have respective sealing surfaces contacting one another. The slide ring sealing surface faces the counter ring sealing surface. The slide ring is pressed against the counter ring by a bellows-like spring element. The slide ring seal may be designed so the slide ring seal has an especially flexible slide ring and/or counter ring after economical and trouble-free production, the slide ring seal has at least one sealing surface with elevations or unevenness of a magnitude from 0.1 μm to W mm, W conforms to the formula W=0.03 Dm/s, wherein the average diameter Dm is the average of the circular-ring-shaped sealing surface's outside (Da) and inside (Di) diameter, and s is the slide ring or counter ring thickness.

20 Claims, 19 Drawing Sheets

(56) References Cited

U.S. PATENT DOCUMENTS

| | | | |
|---|---|---|---|
| 5,332,235 A * | 7/1994 | Fone | F16J 15/36 277/380 |
| 6,325,380 B1 | 12/2001 | Feigl et al. | |
| 6,523,832 B1 | 2/2003 | Nakano | |
| 7,708,285 B2 * | 5/2010 | Grimanis | F16J 15/36 277/379 |
| 2004/0245729 A1 | 12/2004 | Bock et al. | |
| 2014/0062027 A1 * | 3/2014 | Neuberger | F16J 15/16 277/358 |

FOREIGN PATENT DOCUMENTS

| | | |
|---|---|---|
| DE | 102011114349 A1 | 4/2012 |
| EP | 1054196 A2 | 11/2000 |
| GB | 2061411 A | 5/1981 |

* cited by examiner

SLIDE RING SEAL

CROSS-REFERENCE TO RELATED APPLICATIONS

This application is a U.S. national stage application under 35 U.S.C. §371 of International Application No. PCT/EP2014/000936, filed on Apr. 8, 2014, and claims benefit to German Patent Application No. DE 10 2013 006 840.1, filed on Apr. 22, 2013, and international application PCT/EP2013/002050, filed on Jul. 11, 2013. The International Application presently nationalized was published in German on Oct. 30, 2014, as WO 2014/173495 A2 under PCT Article 21(2).

FIELD

The invention relates to a slide ring seal.

BACKGROUND

DE 10 2011 114 349 A1 has already disclosed a slide ring seal having a bellows-like spring means. In the case of the slide ring seal described above, the counterpart ring is accommodated in a supporting ring, wherein the supporting ring in turn is assigned to a shaft. The supporting ring is fixedly connected to the shaft so as to drive the counterpart ring along during a rotation of the shaft.

Against this background, there is a demand for slide ring seals, the slide rings or counterpart rings of which are particularly flexible in order to compensate vibrations without problems.

SUMMARY

An aspect of the invention provides a slide ring seal, comprising: a slide ring, mounted in an axially movable manner; and a counterpart ring, wherein the slide ring includes a slide ring sealing surface, the counterpart ring includes a counterpart ring sealing surface, the slide ring sealing surface and the counter ring sealing surface bearing against one another, wherein the slide ring sealing surface is situated opposite the counterpart ring sealing surface, wherein the slide ring is pressed against the counterpart ring by a bellows-like spring element, wherein at least one of the slide ring sealing surface and the counter ring sealing surface includes elevations or unevennesses of a size of 0.1 μm to W mm, wherein W is calculated in accordance with formula $$W = 0.03 Dm/s,$$

wherein Dm is a mean diameter representing a mean value of an outer diameter (Da) and a inner diameter (Di) of the slide ring sealing surface and the counter ring sealing surface, which is circular-ring-shaped sealing surface, and wherein s is a thickness of the slide ring or counterpart ring.

BRIEF DESCRIPTION OF THE DRAWING

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
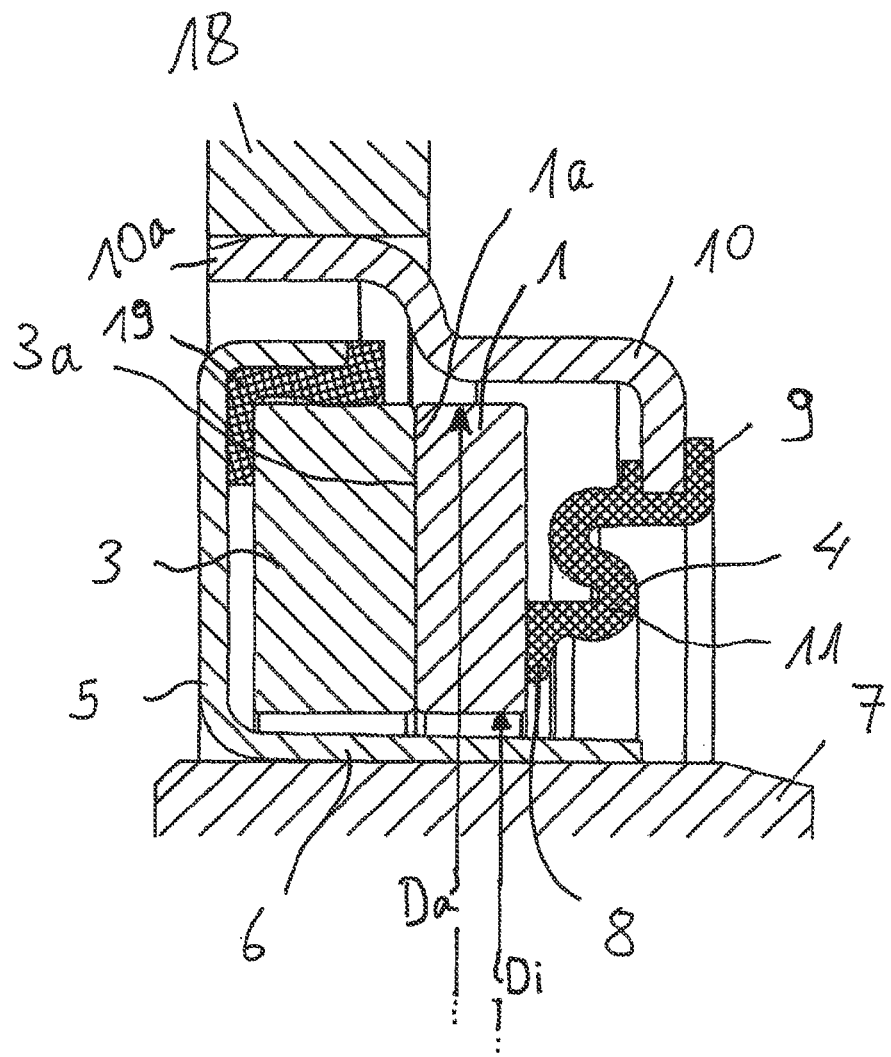
FIG. 1 is a sectional view of the upper part of a slide ring seal, wherein the counterpart ring and the slide ring are flexible such that they can compensate unevennesses of 0.1 to 500 μm.

An aspect of the invention refines and develops a slide ring seal of the type specified in the introduction such that, after inexpensive and problem-free manufacture, it has a particularly flexible slide ring and/or counterpart ring.

According to an aspect of the invention, at least one sealing surface has elevations or unevennesses of a size of 0.1 μm to W, wherein W is calculated in accordance with formula $$W=0.03Dm/s,$$

wherein the mean diameter Dm represents the mean value of outer diameter and inner diameter of the circular-ring-shaped sealing surface and wherein s represents the thickness of the slide ring or counterpart ring. According to the invention, it has firstly been identified that, in the case of a slide ring seal whose sealing surfaces are highly flexible, manufacturing-induced unevennesses can be compensated with relatively few problems. Specifically, it has been identified that manufacturing-induced unevennesses on the slide ring and/or on the counterpart ring can be compensated by the bellows-like spring means. The unevennesses can be compensated by the spring force of the bellows-like spring means alone. Cumbersome rectification and reworking of sealing surfaces of counterpart ring and slide ring are thus not necessary. It is known from the prior art for slide ring seals to be manufactured such that the sealing surfaces thereof have unevennesses which amount, at most, to a few μm. According to the invention, manufacturing steps can be omitted, because, by means of flexible sealing surfaces, larger unevennesses can be tolerated. An elevation, unevenness or evenness within the context of this description is measured in accordance with DIN ISO 1101.

The above-specified factor of 0.03 may also assume a higher value that a person skilled in the art may find suitable on the basis of this description.

Against this background, it would be possible for at least one sealing surface to have elevations or unevennesses of a size between 1 μm and W, preferably of a size between 5 μm and W, particularly preferably of a size between 20 μm and W, most preferably of a size between 50 μm and W, wherein the elevations or unevennesses do not comprise surface roughnesses or gas grooves. The elevations or unevennesses are ultimately undulation peaks and undulation troughs encountered on an encircling path on a sealing surface. In this respect, surface roughnesses or gas grooves are not included among the structures that influence the unevenness or undulation of the slide ring and/or counterpart ring.

It would be possible for the elevations or unevennesses to be in the form of undulation troughs and undulation peaks. The elevations or unevennesses are undulation peaks and undulation troughs encountered on an encircling path on a sealing surface. It is therefore advantageously also possible for undulating slide rings and counterpart rings to be used.

It would be possible for the elevations or unevennesses on a sealing surface to have at least two high points and two low points, preferably three high points and three low points, particularly preferably four high points and four low points. The elevations or unevennesses are ultimately undulation peaks and undulation troughs encountered on an encircling path on a sealing surface. Depending on the undulation, a different number of undulation peaks and undulation troughs may be encountered. Said undulation may be substantially levelled.

The elevations or unevennesses on at least one sealing surface can, by way of the bellows-like spring means, be at least partially deformed such that no impairment of function occurs during the operation of the slide ring seal. The bellows-like spring means can apply a force to a sealing surface, which force substantially levels the undulation of said sealing surface. Complete levelling is also possible.

The bellows-like spring means could bear by way of an annular abutment region against the slide ring and be fixed by way of an annular connection region to a housing, wherein the abutment region and the connection region are connected to one another by at least one elastically deformable hinge region. By means of this specific refinement, the spring means has imparted to it a geometric shape which enables said spring means to deflect slightly and deform in each of the radial, torsional and axial directions. It is nevertheless possible, by means of the hinge region and a suitable selection of the stiffness of the elastomer, for an adequate contact-pressure force to be exerted on the slide ring. Against this background, the hinge region could be of S-shaped form in cross section. Such a hinge region can be deflected particularly easily and without problems in the radial, torsional and axial directions. The bellows-like spring means is manufactured preferably from a polymer, in particular an elastomer. The elastomer particularly preferably is or has a natural rubber.

The counterpart ring could be accommodated by a support body which has an axial projection for pressing onto a shaft. In this way, an interference fit can be realized between support body and shaft.

A region of the projection could be of frustoconical form in cross section such that the interior space of the projection for accommodating a shaft runs conically. The interior space of the projection is substantially a hollow cylinder adjoined by a frustoconical portion. The conical profile of the interior space facilitates the introduction of the support body onto the shaft. The conical configuration makes it possible to accommodate shafts of slightly fluctuating diameter. As a result of the formation of a conical profile, it is ensured that one region does not bear against the shaft. In this way, deformations induced by an interference fit are not transmitted to the support body to such an extent that the orientation of the counterpart ring is adversely affected. Smaller positional errors of a counterpart ring thus arise during an assembly process, such that the slide ring seal is made highly robust. Since the conical profile provides a decoupling action, large overlaps and plastic deformations in a metal sheet are admissible. The support body may be seated on the shaft in such a way that a sealing seat is provided without additional sealing aids. The sealing seat may exhibit metallic sealing. A plastic deformation makes it possible for leakage channels to be reliably closed off.

The quotient of a first circular-ring-shaped area, which faces toward the spring means, on the slide ring and of a projected, second circular-ring-shaped area, which extends between an abutment region of the spring means against the slide ring and a connection region of the spring means on a housing, could be selected such that, as a result of pressure variation (in a chamber 20, see FIG. 4), a second force acting on the projected, second circular-ring-shaped area axially in the direction of the slide ring is between 1% and 100,000%, preferably between 10% and 1000%, particularly preferably between 10% and 100%, of a first force which, as a result of pressure variation (in a chamber 20, see FIG. 4), acts on the first circular-ring-shaped area axially in the direction of the counterpart ring. In this way, greater pressure differences, and in particular fluctuating pressure conditions, virtually cannot impair a reliable sealing action.

Furthermore, with said arrangement, pressure stability can be attained with a configuration in a very small installation space. A small installation space can be utilized even in the case of non-fluctuating pressure loading.

The percentage values specified in the stated intervals should be suitably selected according to the specific application depending on the pressure difference with respect to which sealing is to be provided. A slide ring seal having a k-factor of approximately 0 can thus be realized in a simple manner. Normally, slide ring seals must have k-factors in the range from 0.6 to 0.8 in order to provide reliable sealing with respect to pressure.

The k-factor is the so-called hydraulic load factor. Known slide ring seals are however usable only to a limited extent under fluctuating pressure conditions. A slide ring seal which has a very low k-factor can withstand even fluctuating pressure conditions and provide reliable sealing with respect thereto. Even much higher percentage values which a person skilled in the art may find suitable on the basis of this description are conceivable as an upper limit.

The spring means could have a radial lip which bears against the slide ring and which has the same inner diameter as or a larger inner diameter than the support body. The radial lip is preferably formed in a materially integral manner and in one piece with the spring means. In this way, dirt can be prevented from passing into the region of the sealing surfaces.

Against this background, the spring means could have a radial lip which bears against the slide ring and which has the same inner diameter as the support body. By means of this specific refinement, it is ensured that the radial lip bears in a contiguous manner against the outer circumferential surface of a shaft and has the effect that virtually no particles can pass into the region of the sealing surfaces.

The spring means could have a radial lip which projects at an angle from the slide ring and which has the same inner diameter as or a larger inner diameter than the support body. Owing to the angle, the radial lip is slightly deformable and can be pressed without problems against the outer circumferential surface of a shaft.

Against this background, the spring means could have a radial lip which projects at an angle from the slide ring and which has the same inner diameter as the support body. Such a radial lip bears in a contiguous manner against an outer circumferential surface of a shaft, such that virtually no particles can pass said radial lip.

The spring means could have a dust lip which bears against the abutment region thereof and which has the same inner diameter as or a larger inner diameter than the support body. The dust lip is not formed materially integrally with the spring means. The dust lip may for example be manufactured from a nonwoven. Specifically, it is conceivable for a disc composed of a nonwoven to be provided. By means of a dust lip, dust can be prevented from passing into the region of the sealing surfaces.

Against this background, the spring means could have a dust lip which bears against the abutment region thereof and which has the same inner diameter as the support body. By means of this specific refinement, is ensured that the dust lip bears in a contiguous manner against the outer circumferential surface of a shaft. By means of this specific refinement, virtually no dust can pass the dust lip.

The spring means could have a dust lip which bears against the connection region thereof and which has the same inner diameter as or a larger inner diameter than the support body. As a result of the connection of the dust lip to the connection region, the dust lip is slightly deformable in a flexible manner, without abutting against and disrupting the spring means.

Against this background, the spring means could have a dust lip which bears against the connection region thereof and which has the same inner diameter as the support body. By means of this specific refinement, a slightly deformable and flexible dust lip can be realized which, in the normal state, bears in a contiguous manner against the outer circumferential surface of a shaft.

The spring means could be surrounded at least partially in an axial and/or radial direction by a wall. A labyrinth seal is realized in this way.

Against this background, the wall could be a part of a support body in which the counterpart ring is accommodated. By means of this specific refinement, it is not necessary for a separate wall to be provided, and the support body can rather be pressed onto the shaft and simultaneously form a labyrinth seal.

A gap could be formed between the projection and the counterpart ring. Turbulence can form in the gap, whereby dirt particles are retained in the gap, but particle-free air can pass between the sealing surfaces.

It is also conceivable for the gap to serve as a collecting channel for oil. Oil which has collected in the gap or the collecting channel can be fed back by the rotation of the counterpart ring.

The projection could extend in an axial direction to such an extent that the projection also runs under the slide ring. By means of this specific refinement, air can advantageously be conducted between the sealing surfaces.

It would be possible for the slide ring seal described here to be gas-lubricated. It has surprisingly been found that the slide ring seal functions using a gas, despite the elevations or unevennesses described here. A person skilled in the art would have expected the slide ring seal to work well only when using a liquid.

It would be possible for the sealing surface of the slide ring and/or the sealing surface of the counterpart ring to have hydrodynamic structures, in particular sickle-shaped structures. In this way, the build-up of pressure between the sealing surfaces is improved. Structures of said type are disclosed in EP 1 054 196 A2. Against this background, it is also conceivable for hydrodynamic structures to be provided which act in both directions of rotation.

It would be possible for the slide ring seal described here to be used as a seal of the crankshaft of internal combustion engines. Said slide ring seal is particularly suitable for this as it exhibits low friction.

The slide ring seal described here may be used for gearbox seals with high sliding speeds and moderate pressures. It is in particular conceivable for the slide ring seal to be used in the automotive industry. Here, specifically, it is conceivable for the slide ring seal to be used as a turbocharger seal, crankshaft seal, gearbox seal or electric motor seal.

It is possible for the slide ring seal described here to be configured as a gas-lubricated slide ring seal. It is also possible for the sealing surfaces to be provided with hydrodynamically active structures.

FIG. 1 shows a slide ring seal, comprising a slide ring 1, which is mounted in an axially movable manner, and a counterpart ring 3, wherein the slide ring 1 and the counterpart ring 3 each have sealing surfaces 1*a*, 3*a* which bear against one another, wherein the sealing surface 1*a* of the slide ring 1 is situated opposite the sealing surface 3*a* of the counterpart ring 3, and wherein the slide ring 1 is pressed against the counterpart ring 3 by a bellows-like spring means 4.

At least one sealing surface 1*a*, 3*a* has elevations or unevennesses of a size of 0.1 μm to W mm, wherein W is calculated in accordance with formula $$W = 0.03 Dm/s,$$

wherein the mean diameter Dm represents the mean value of outer diameter Da and inner diameter Di of the circular-ring-shaped sealing surface 1a, 3a and wherein s represents the thickness of the slide ring 1 or counterpart ring 3.

The values used for Dm and s should be of the same units, for example meters.

At least one sealing surface 1a, 3a has elevations or unevennesses of a size of 0.1 μm to 500 μm. The counterpart ring 3 is accommodated by a support body 5 which has an axial projection 6 for pressing onto a shaft 7.

The elevations or unevennesses are in the form of undulation peaks and undulation troughs.

The elevations or unevennesses on at least one sealing surface 1a, 3a can, by way of the bellows-like spring means 4, be at least partially deformed such that no impairment of function occurs during the operation of the slide ring seal.

The bellows-like spring means 4 bears by way of an annular abutment region 8 against the slide ring 1 and is fixed by way of an annular connection region 9 to a housing 10, wherein the abutment region 8 and the connection region 9 are connected to one another by at least one elastically deformable hinge region 11. The hinge region 11 is of S-shaped form in cross section.

Figure 2:
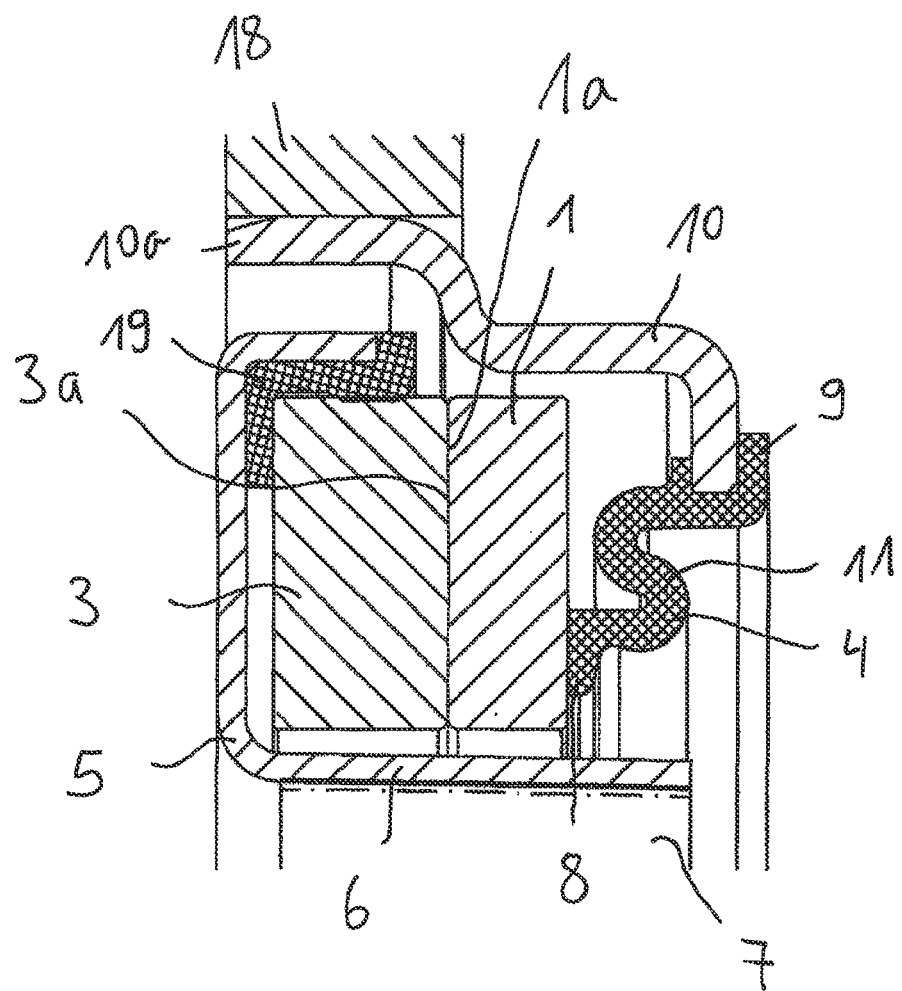
FIG. 2 shows a slide ring seal which has a support body which is seated with an interference fit on a shaft.

FIG. 2 shows that the support body 5 can be pressed by way of its axial projection 6 onto the shaft 7.

Figure 3:
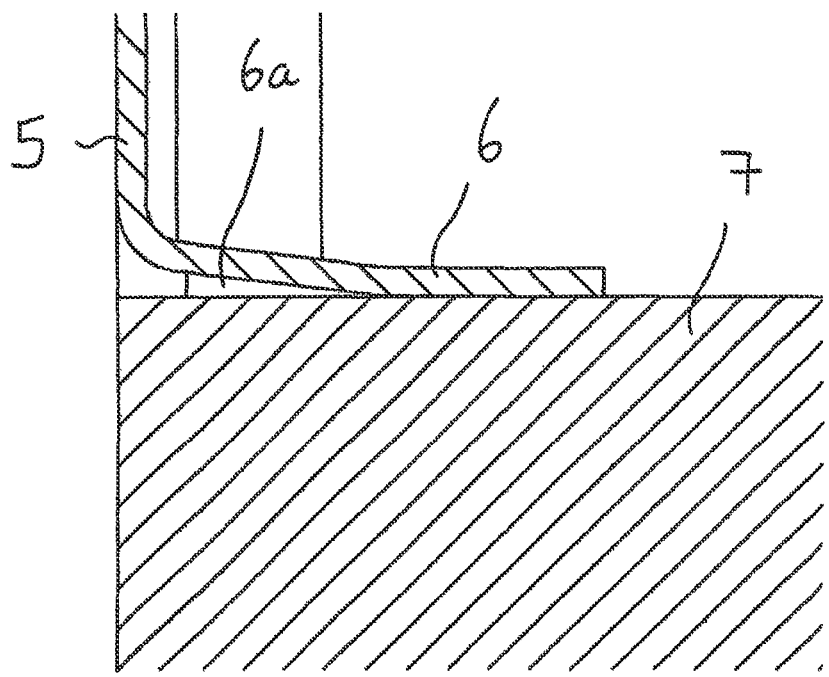
FIG. 3 is a partial sectional illustration of a support body in which approximately two thirds of the projection thereof bear against the outer circumferential surface of a shaft, and approximately one third of the projection rises from the outer circumferential surface so as to form a conically running annular gap.

FIG. 3 shows that a region 6a of the projection 6 is of frustoconical form in cross section, such that the interior space of the projection 6 for accommodating a shaft 7 runs conically. In this way, the counterpart ring 3 is decoupled from forces introduced into the support body 5 by an interference fit of the projection 6.

Figure 4:
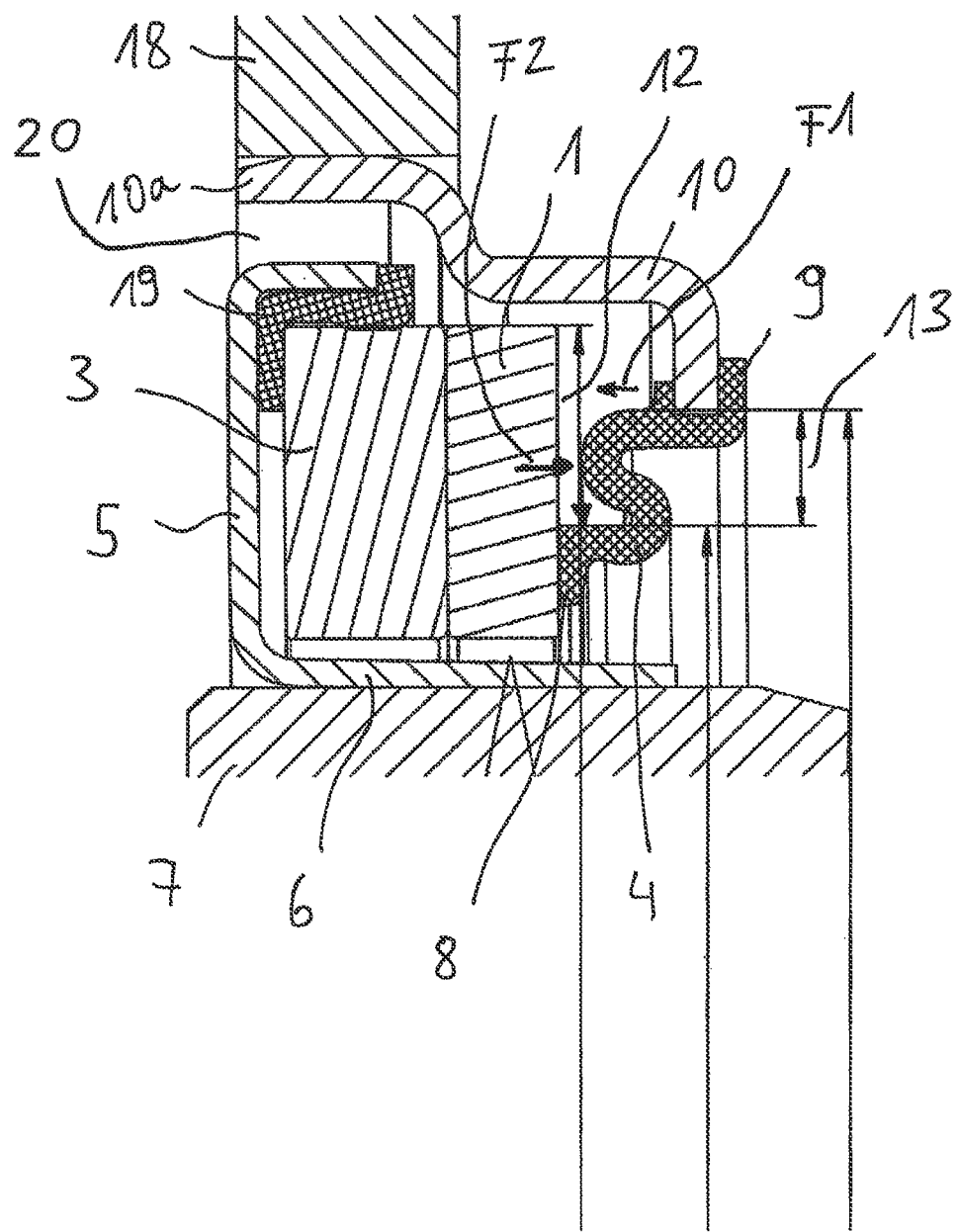
FIG. 4 shows a slide ring seal, wherein circular-ring-shaped areas which can be acted on by pressure forces are illustrated.

FIG. 4 shows a slide ring seal in which, on the slide ring 1, there is formed a first circular-ring-shaped area 12 which can be acted on in an axial direction by a first force F1, wherein the first force F1 is oriented in the direction of the counterpart ring 3.

Also provided is a projected, second circular-ring-shaped area 13. The projected second circular-ring-shaped area 13 extends in a radial direction between an abutment region 8 of the spring means 4 against the slide ring 1 and a connection region 9 of the spring means 4 on a housing 10.

A second force F2 which acts on the projected second circular-ring-shaped area 13 axially in the direction of the slide ring 1 as a result of pressure loading amounts to between 1% and 100,000% of a first force F1 which acts on the first circular-ring-shaped area 12 axially in the direction of the counterpart ring 3.

The first force F1 is advantageously greater than the second force F2. A pressure force acting on the slide ring 1 can be compensated by the spring means 4.

Therefore, the quotient of the first circular-ring-shaped area 12, which faces toward the spring means 4, on the slide ring 1 and of the projected, second circular-ring-shaped area 13, which extends between the abutment region 8 of the spring means 4 against the slide ring 1 and the connection region 9 of the spring means 4 to the housing 10, is selected such that, as a result of pressure variation in a chamber 20, the second force F2 acting on the projected, second circular-ring-shaped area 13 axially in the direction of the slide ring 1 is between 1% and 100,000%, of the first force F1 which, as a result of pressure variation in a chamber 20, acts on the first circular-ring-shaped area 12 axially in the direction of the counterpart ring 3.

Figure 5:
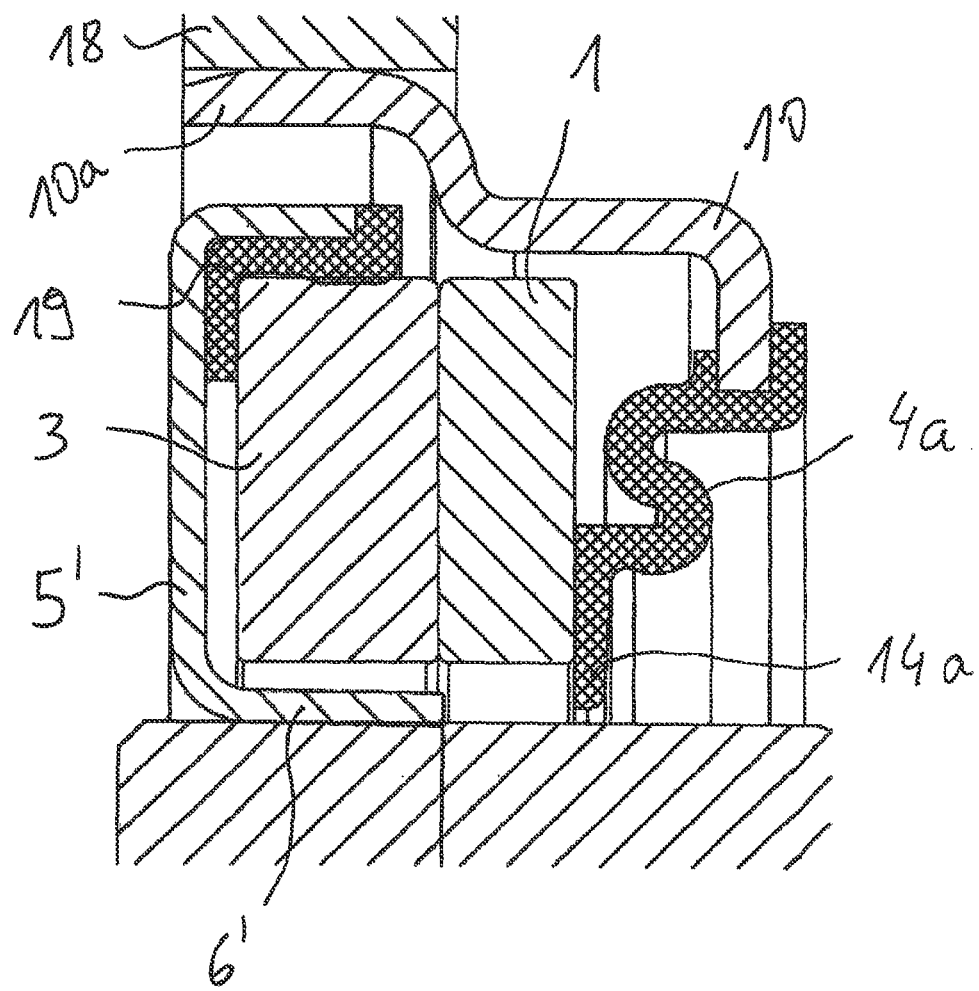
FIG. 5 shows a slide ring seal in which a radial lip runs parallel to the sealing surfaces.

FIG. 5 shows a slide ring seal in which the spring means 4a has a radial lip 14a which bears against the slide ring 1 and which has a larger inner diameter than the support body 5'.

Figure 6:
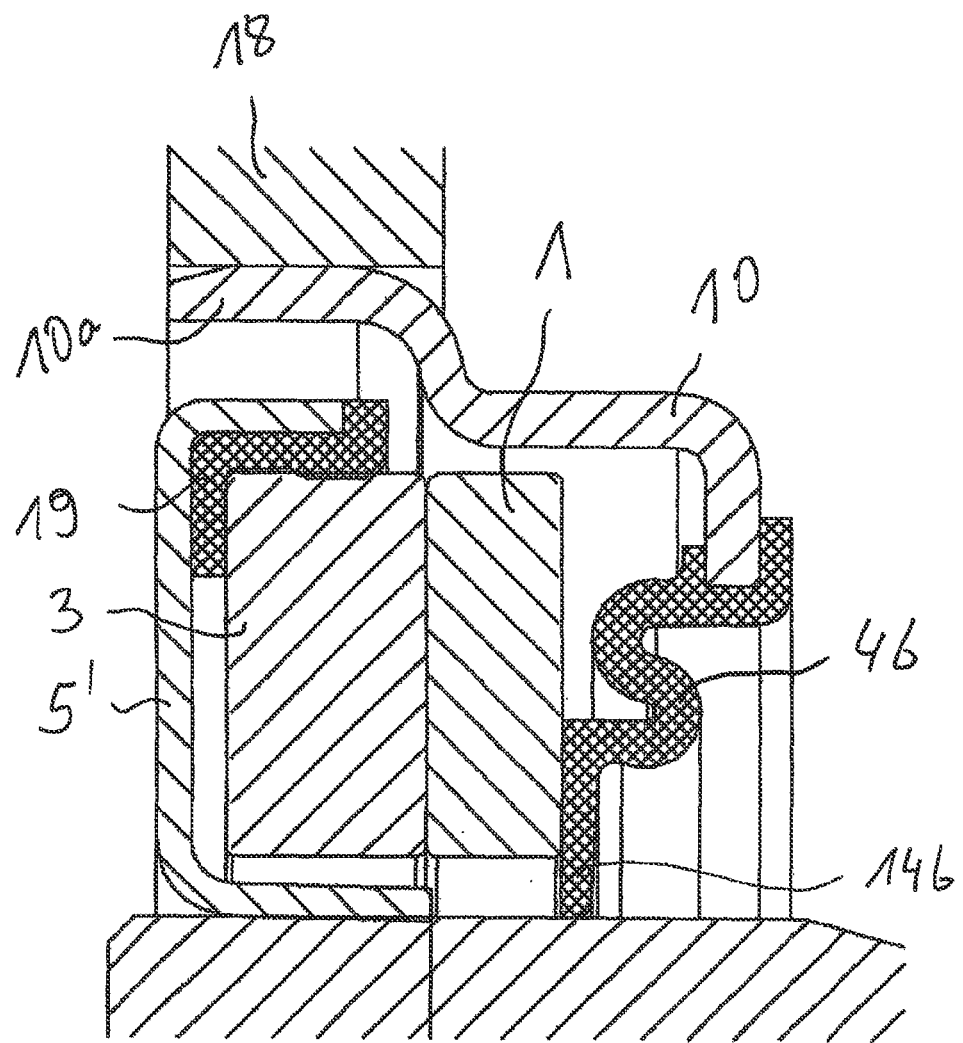
FIG. 6 shows a further slide ring seal in which a slightly longer radial lip runs parallel to the sealing surfaces.

FIG. 6 shows that the spring means 4b has a radial lip 14b which bears against the slide ring 1 and which has the same inner diameter as the support body 5'.

Figure 7:
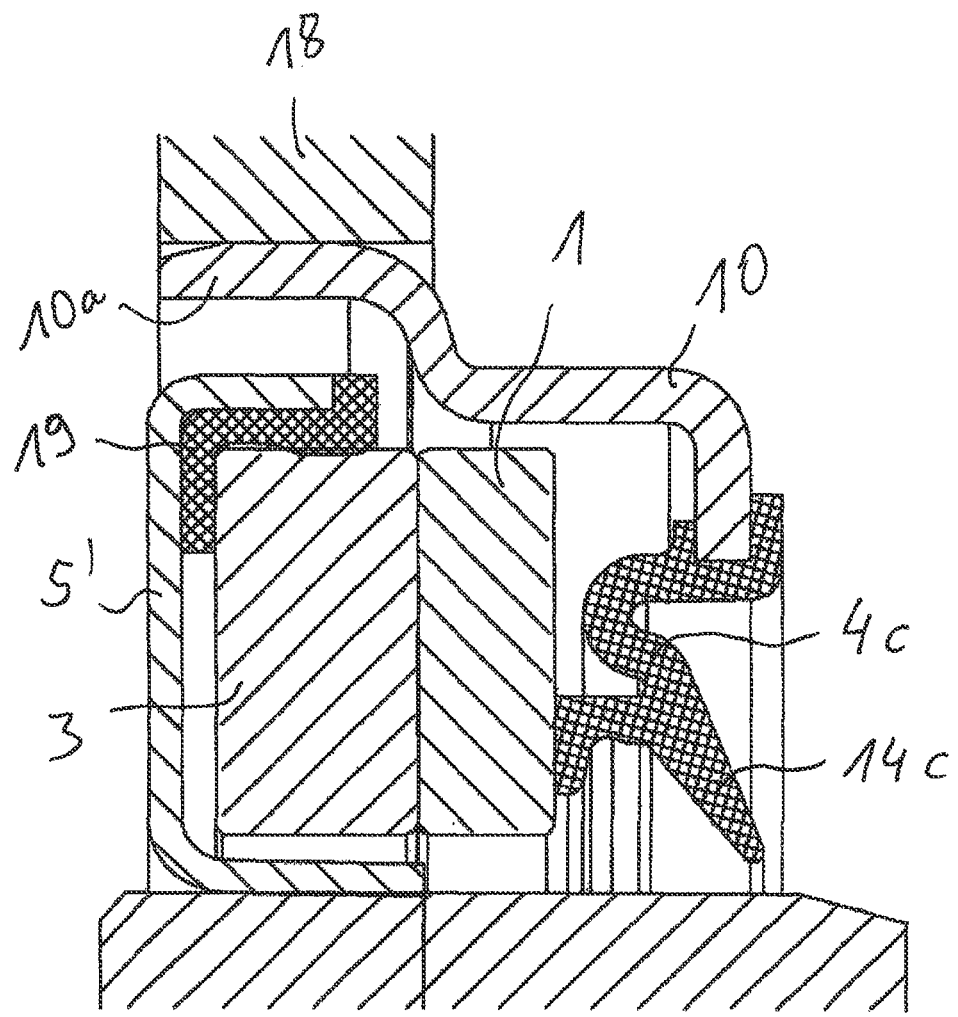
FIG. 7 shows a slide ring seal in which a radial lip is angled so as to enclose an angle, which differs from 90°, with the axis of rotation of the shaft.

FIG. 7 shows that the spring means 4c has a radial lip 14c which projects at an angle from the slide ring 1 and which has a larger inner diameter than the support body 5'.

Figure 8:
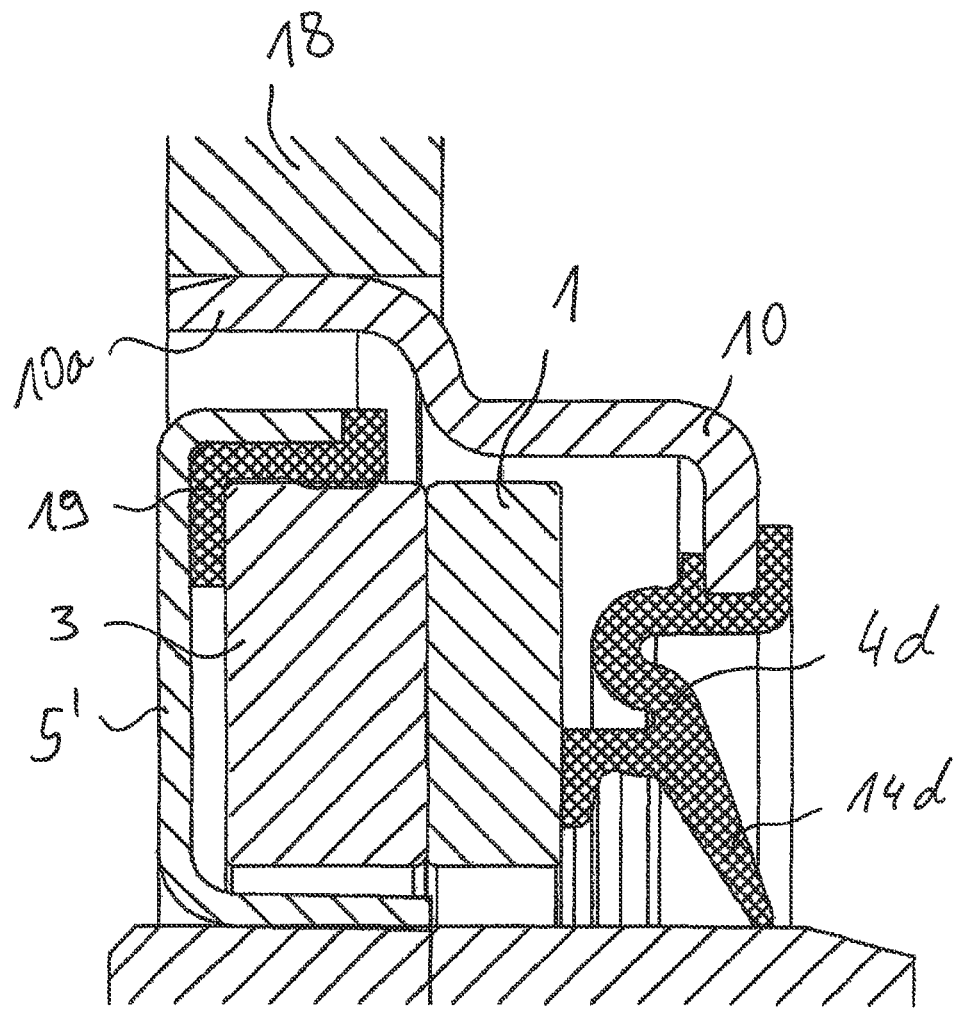
FIG. 8 shows a slide ring seal having a likewise inclined radial lip which bears in a contiguous manner against an outer circumferential surface of a shaft.

FIG. 8 shows that the spring means 4d has a radial lip 14d which projects at an angle from the slide ring 1 and which has the same inner diameter as the support body 5'.

Figure 9:
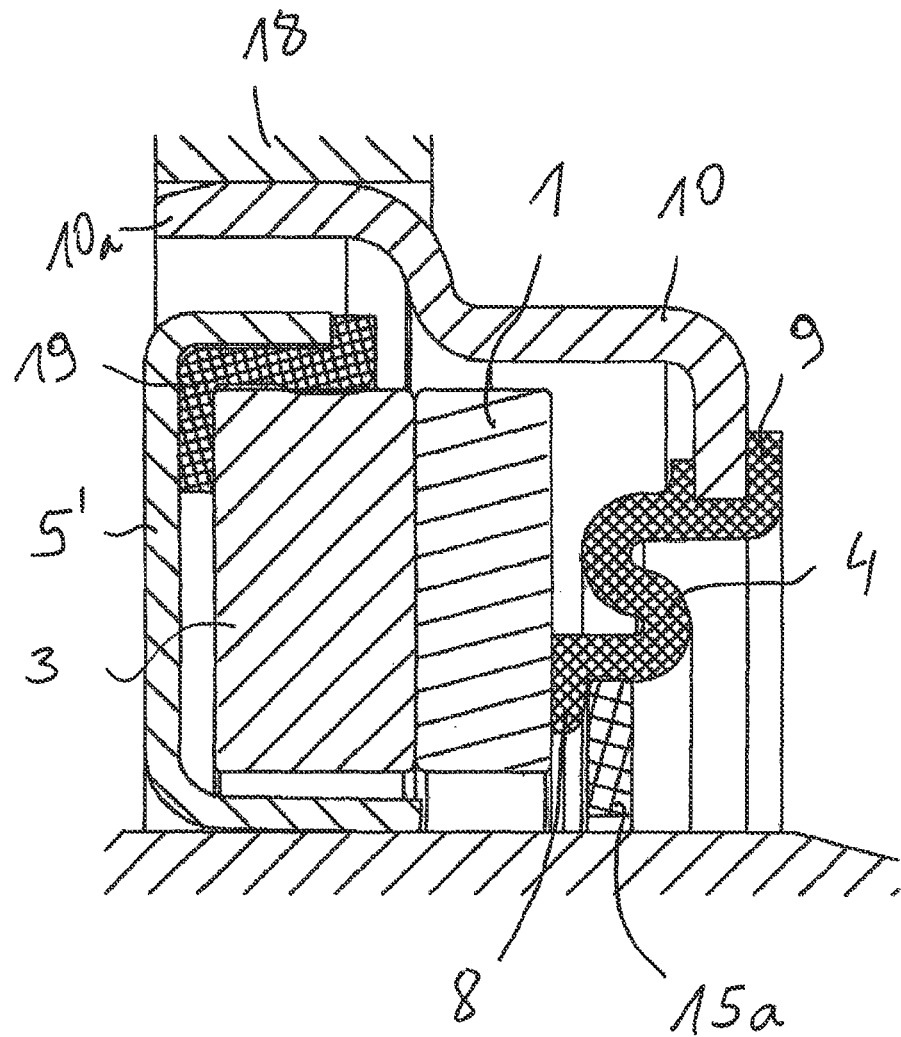
FIG. 9 shows a slide ring seal in which a nonwoven disc is arranged on the spring means.

FIG. 9 shows that the spring means 4 has a dust lip 15a which bears against the abutment region 8 thereof and which has a larger inner diameter than the support body 5'.

Figure 10:
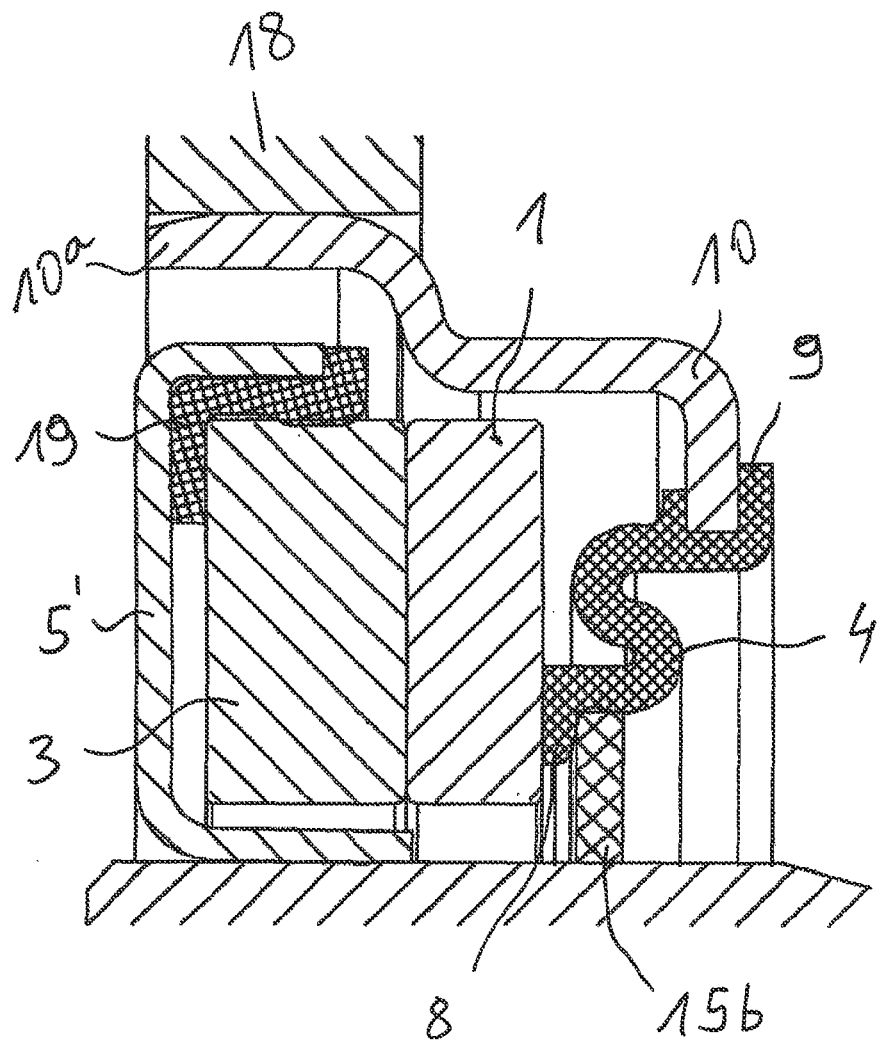
FIG. 10 shows a further slide ring seal in which there is fixed to the spring means a nonwoven disc which is in contiguous contact with the outer circumferential surface of a shaft.

FIG. 10 shows that the spring means 4 has a dust lip 15b which bears against the abutment region 8 thereof and which has the same inner diameter as the support body 5'.

Figure 11:
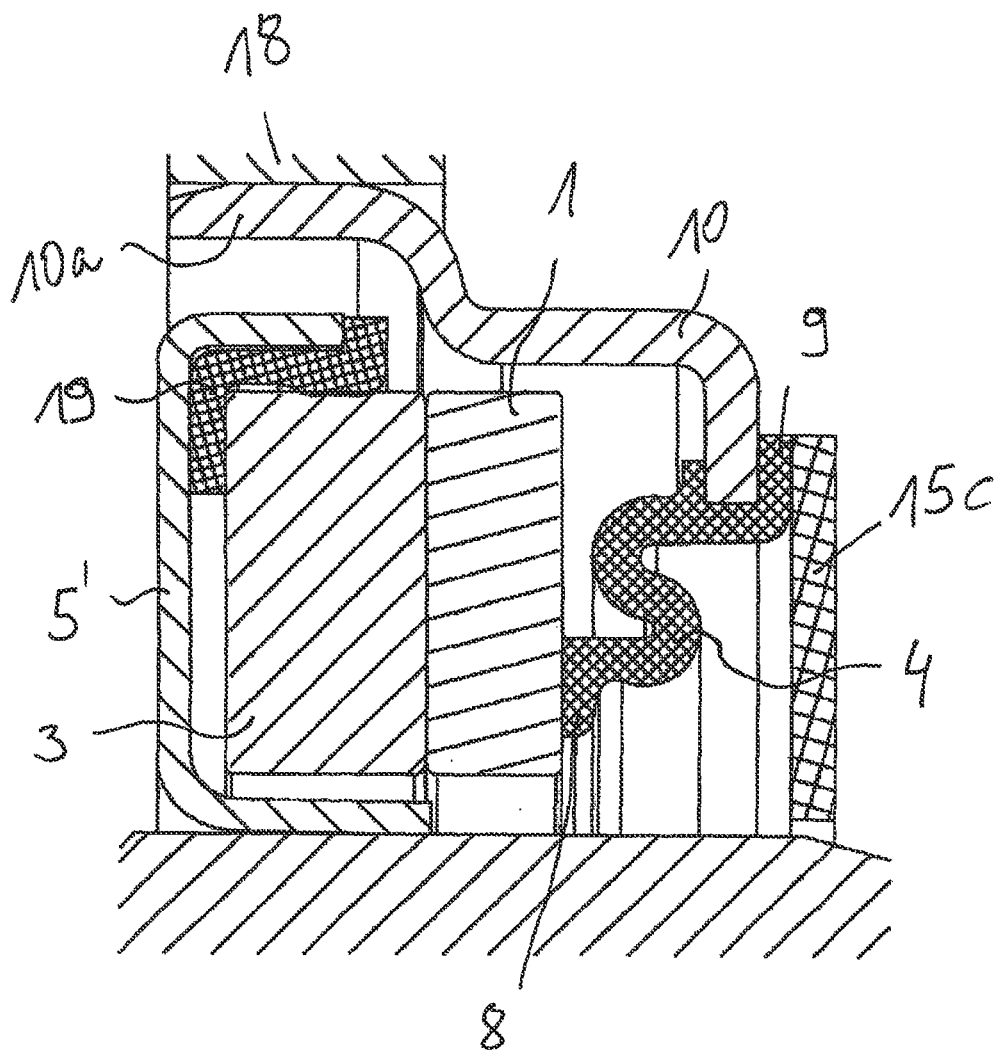
FIG. 11 shows a slide ring seal in which a nonwoven disc is spaced apart from the slide ring to a great extent.

FIG. 11 shows that the spring means 4 has a dust lip 15c which bears against the connection region 9 thereof and which has a larger inner diameter than the support body 5'.

Figure 12:
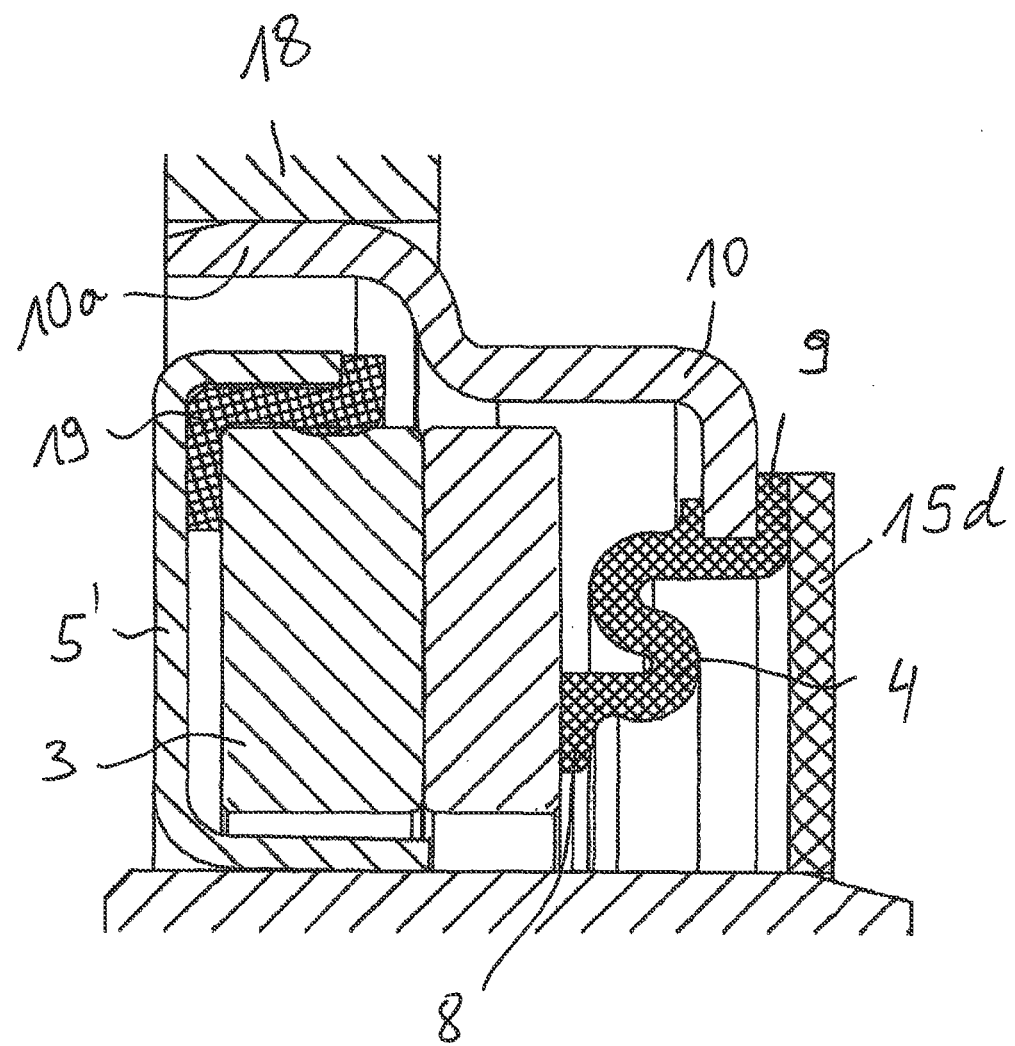
FIG. 12 shows a further slide ring seal in which a nonwoven disc is spaced apart from the slide ring to a relatively great extent but bears against the outer circumferential surface of the shaft.

FIG. 12 shows that the spring means 4 has a dust lip 15d which bears against the connection region 9 thereof and which has the same inner diameter as the support body 5'.

Figure 13:
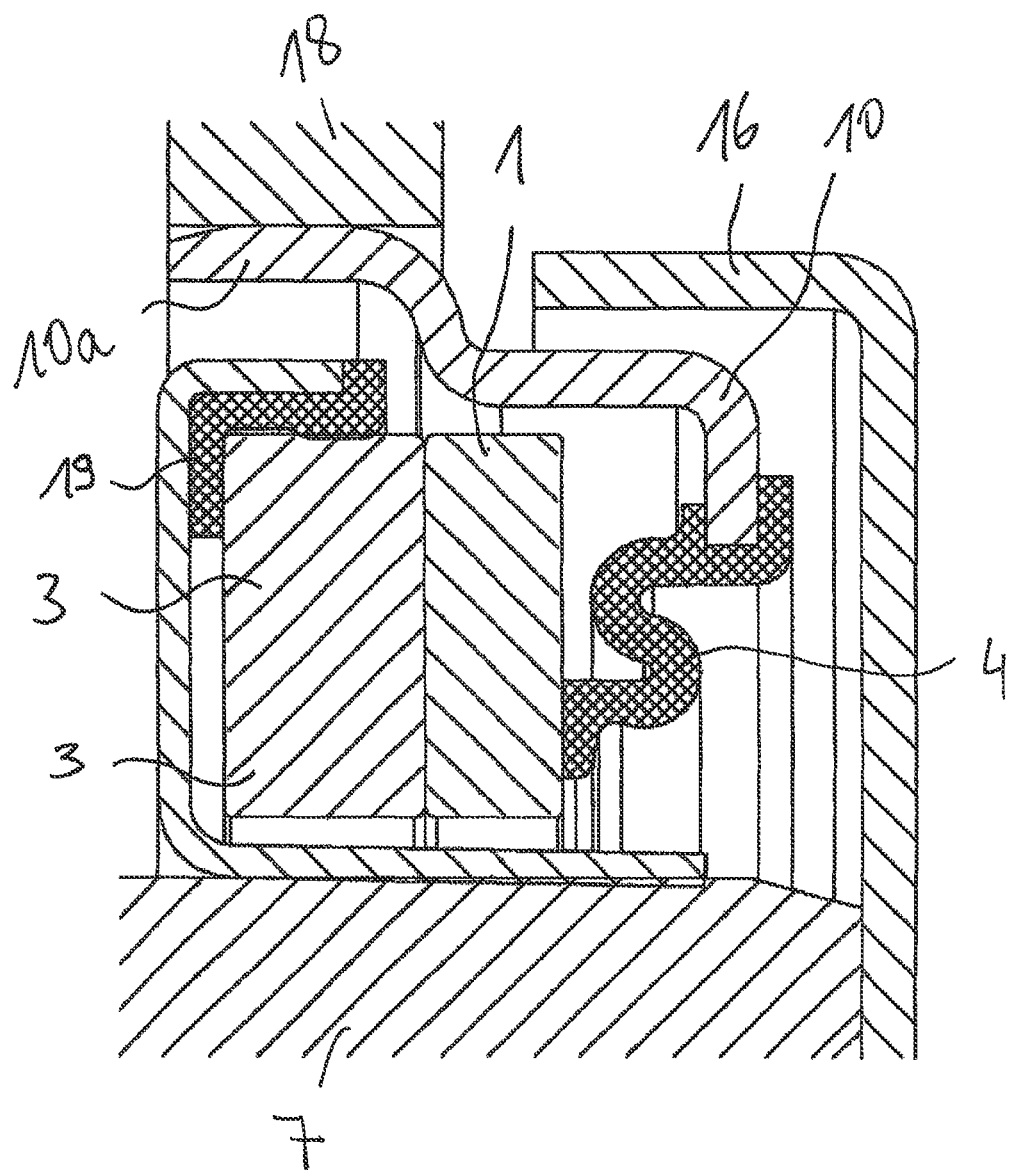
FIG. 13 shows a slide ring seal in which a labyrinth seal is provided.

FIG. 13 shows that the spring means 4 is surrounded at least partially in an axial and/or radial direction by a wall 16. This yields an enclosure of the spring means 4. A labyrinth seal is created.

Figure 14:
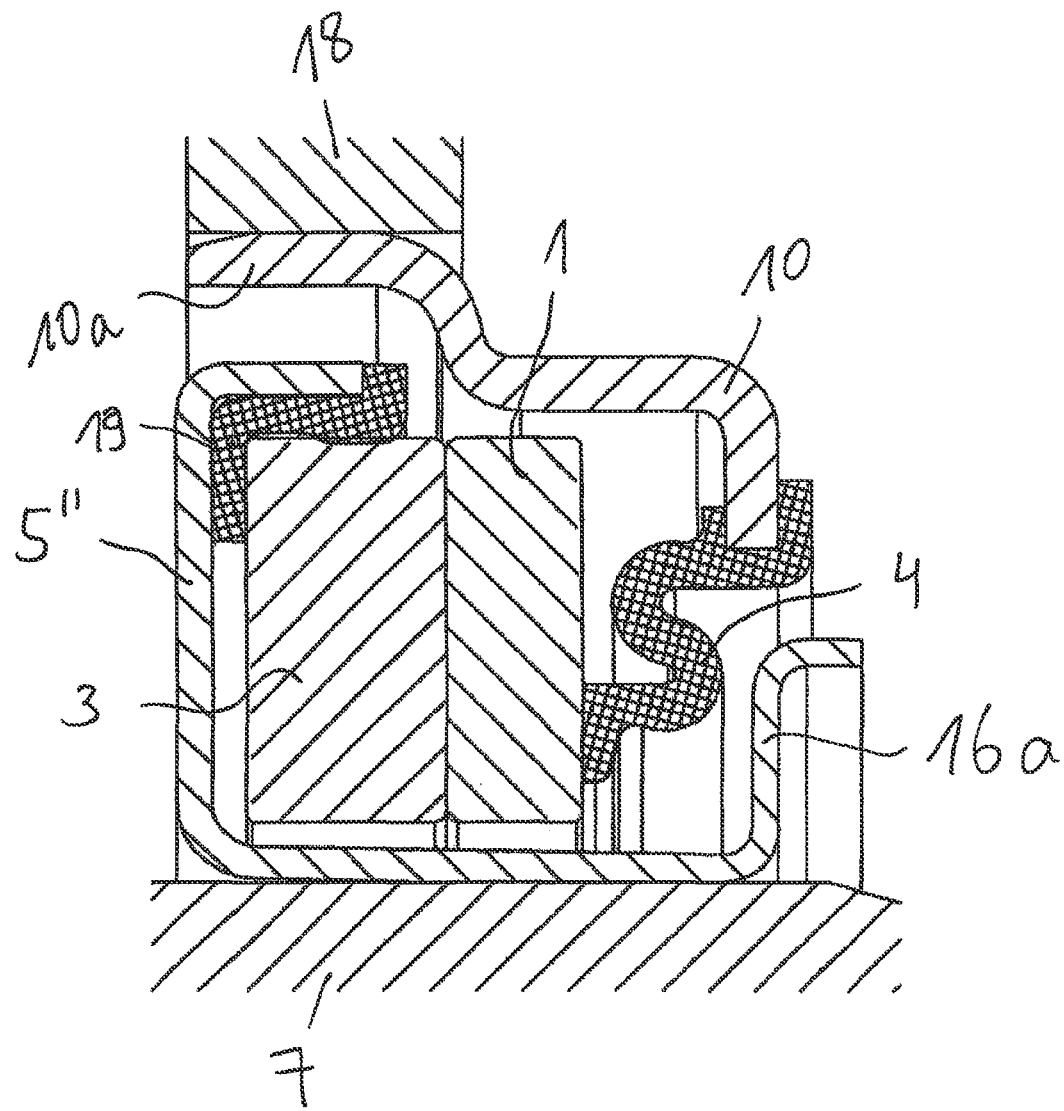
FIG. 14 shows a further slide ring seal in which a labyrinth seal is provided, wherein a wall of the labyrinth seal is formed materially integrally and in one piece with the support body.

FIG. 14 shows that the wall 16a is a part of a support body 5" in which the counterpart ring 3 is accommodated.

Figure 15:
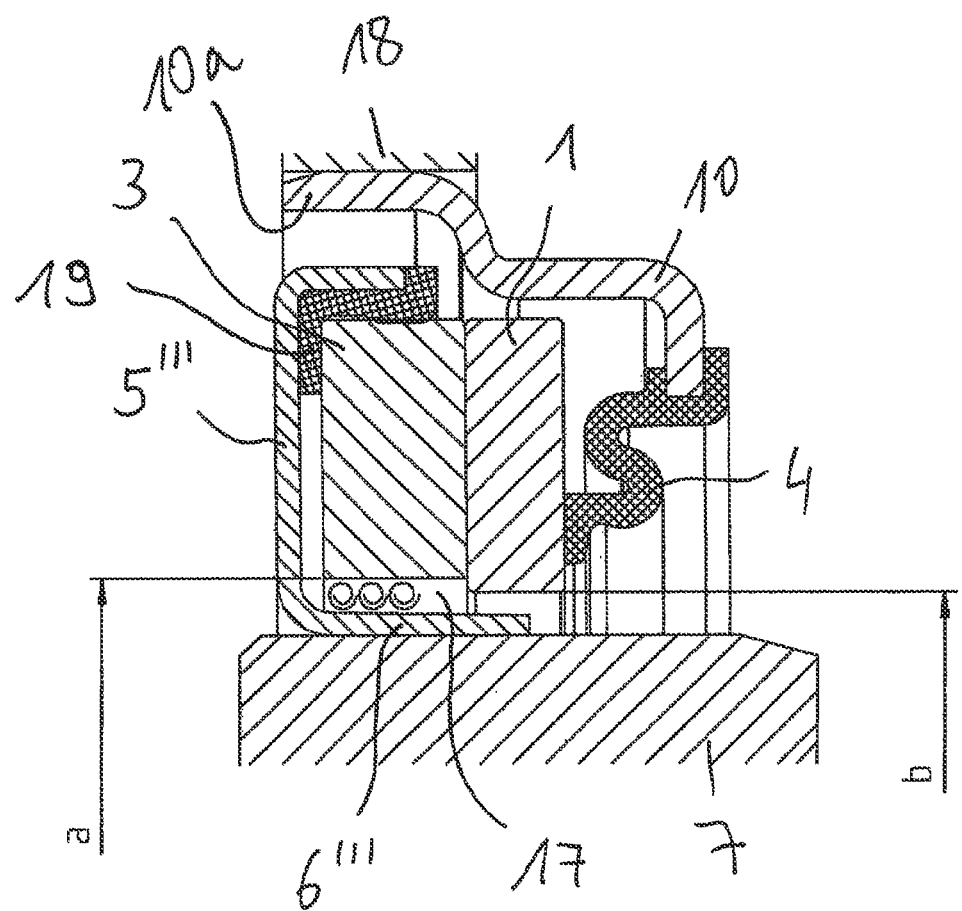
FIG. 15 shows a further slide ring seal in which a gap is provided between the counterpart ring and the support body.

FIG. 15 shows that a gap 17 is formed between the projection 6" and the counterpart ring 3.

Figure 16:
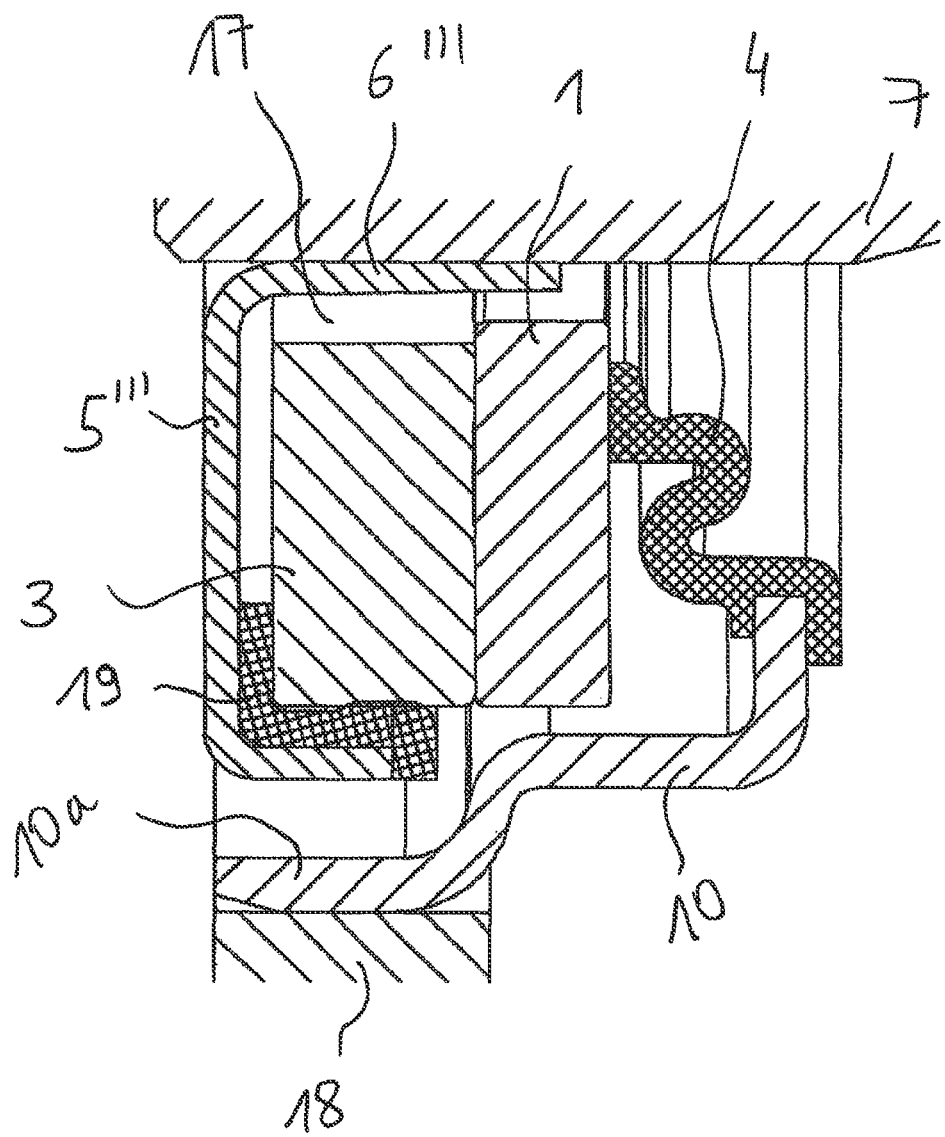
FIG. 16 shows the lower part of the slide ring seal as per FIG. 15, wherein the gap functions as a collecting channel for oil.

FIG. 16 shows the lower part of the slide ring seal as per FIG. 15. Here, the gap 17 functions as a collecting channel for oil which can be fed back.

Figure 17:
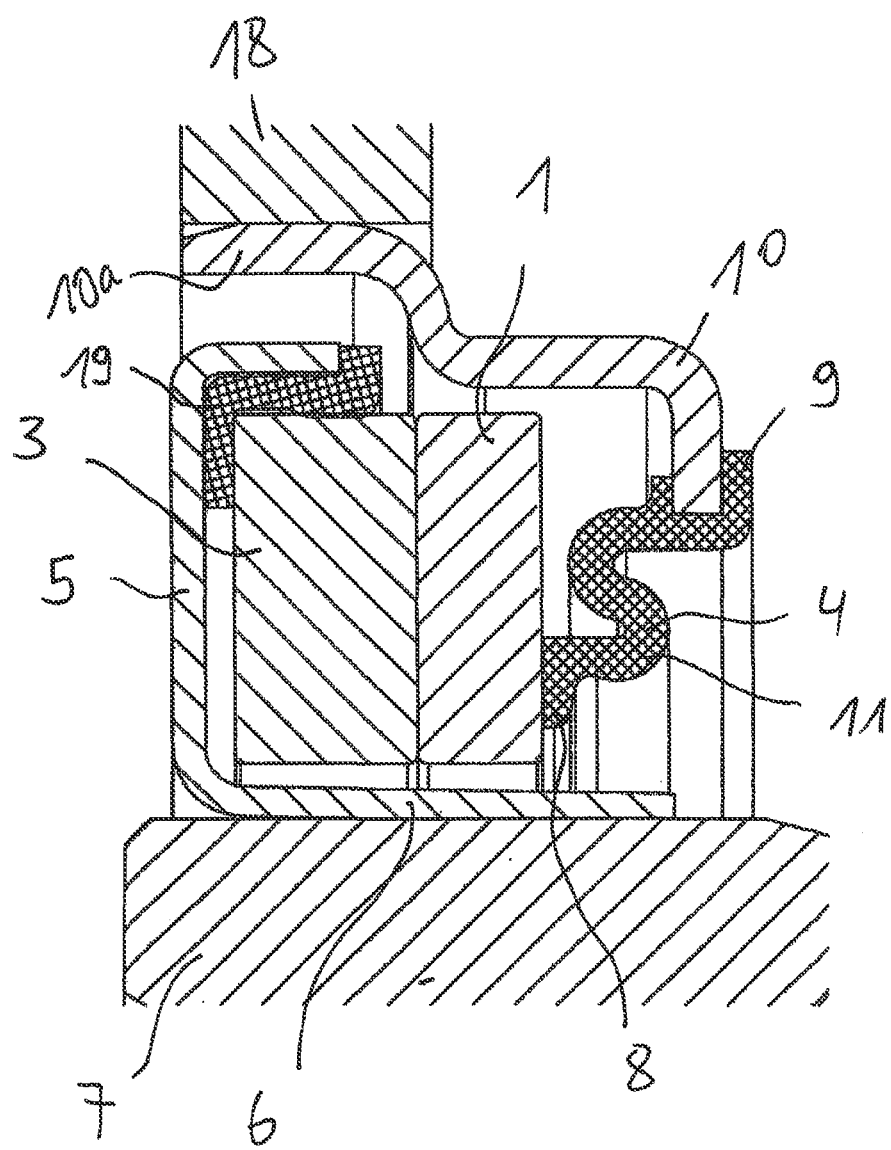
FIG. 17 shows a slide ring seal in which the projection of the support body runs under both the counterpart ring and also the slide ring.

FIG. 17 shows that the projection 6 extends in an axial direction to such an extent that the projection 6 also runs under the slide ring 1.

The counterpart ring 3 is formed and/or arranged such that rotational forces induce a slight conicity or deformation. This applies to all of the slide ring seals described in FIGS. 1 to 18.

Figure 18:
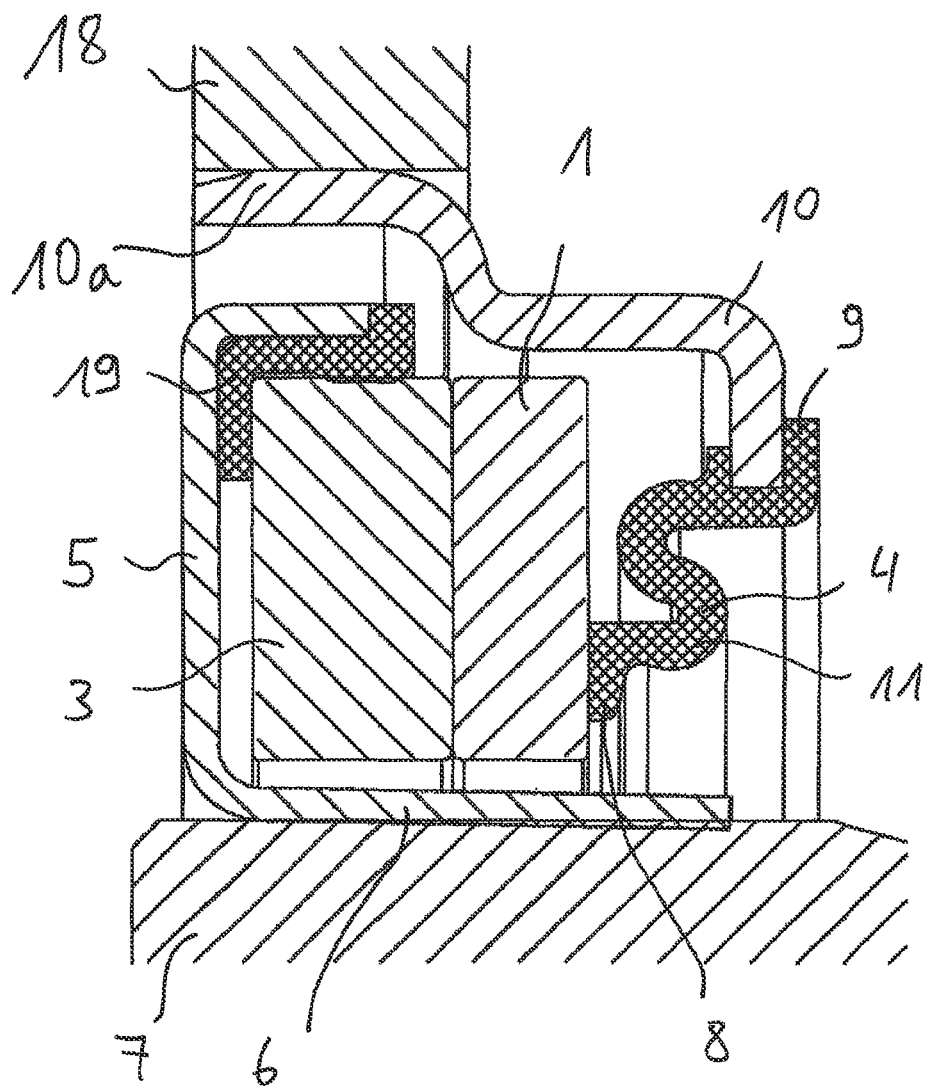
FIG. 18 shows a slide ring seal in which the projection of the support body bears in a metallically sealing manner against the outer circumferential surface of a shaft.

FIG. 18 shows a slide ring seal in which a region 10a of the housing is applied to a counterpart wall 18 in a metallically sealing, fully rubberized or partially rubberized manner or with the interposition of a sealing compound, in particular a sealing lacquer.

In the slide ring seals according to FIG. 1 to FIG. 18, the counterpart ring 3 could be of symmetrical design such that centrifugal forces have no influence on the deformation thereof.

The projection 6 could be statically sealed with respect to the shaft 7. The static seal may be of fully rubberized or partially rubberized form or provided with sealing lacquer or of metallically sealing form.

In the slide ring seals according to FIG. 1 to FIG. 18, the counterpart ring 3 is assigned a signal track 19. In this way, the slide ring seal can simultaneously function as an encoder. The signal track 19 may be composed of an elastomer in which magnetizable or magnetized particles are embedded.

Figure 19:
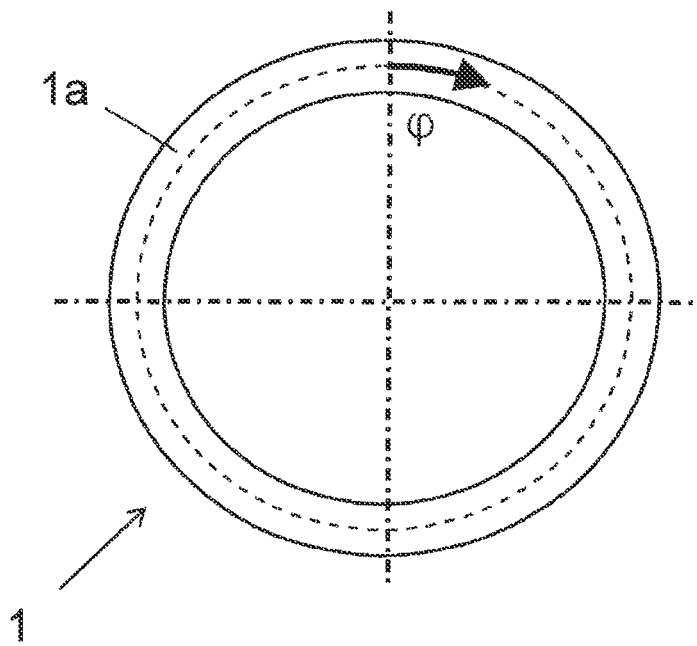
FIG. 19 shows, in the top view, a plan view of a sealing surface and, in the bottom view, the representation of the profile of a standardized unevenness all around the sealing surface.
Figure 19:
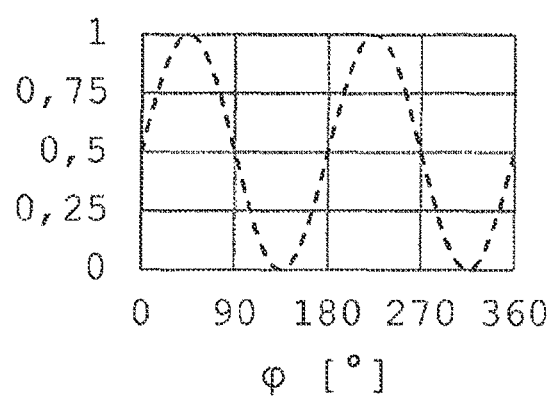

FIG. 19 shows the undulation of the slide ring 1 on an encircling path on its sealing surface 1a. The angle φ assumes values between 0 and 360 degrees.

FIG. 19 illustrates that two high points and two low points are passed through during one revolution on a sealing surface 1a. The elevations or unevennesses on a sealing surface 1a therefore have two high points and two low points, specifically two undulation peaks and two undulation troughs, in the specific situation.

The elevations or unevennesses on a sealing surface 1a, 3a, specifically undulation troughs and undulation peaks, can, by way of the bellows-like spring means 4, be at least partially deformed such that no impairment of function occurs during the operation of the slide ring seal.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. A slide ring seal, comprising:
   a slide ring, mounted in an axially movable manner;
   a counterpart ring; and
   a bellows spring element,
   wherein the slide ring includes a slide ring sealing surface, the counterpart ring includes a counterpart ring sealing surface, the slide ring sealing surface and the counter ring sealing surface bearing against one another,
   wherein the slide ring sealing surface is situated opposite the counterpart ring sealing surface,
   wherein the slide ring is pressed against the counterpart ring by the bellows spring element,
   wherein at least one of the slide ring sealing surface and the counter ring sealing surface includes elevations or unevennesses of a size of 0.1 μm to W mm,
   wherein W is calculated in accordance with formula $$W = 0.03 Dm/s,$$

wherein Dm is a mean diameter representing a mean value of an outer diameter (Da) and a inner diameter (Di) of the slide ring sealing surface and the counter ring sealing surface, which is circular-ring-shaped sealing surface, and
   wherein s is a thickness of the slide ring or counterpart ring.

2. The seal of claim 1, wherein the at least one sealing surface includes elevations or unevennesses of a size between 1 μm and W.

3. The seal of claim 1, wherein the elevations or unevennesses are in the form of undulation troughs and undulation peaks.

4. The seal of claim 1, wherein the elevations or unevennesses on the at least one sealing surface include at least two high points and two low points.

5. The seal of claim 1, wherein the elevations or unevennesses on the at least one sealing surface can, by way of the bellows spring element, be at least partially deformed such that no impairment of function occurs during operation of the slide ring seal.

6. The seal of claim 1, wherein the bellows spring element bears, by way of an annular abutment region, against the slide ring,
   wherein the bellows spring element is fixed, by way of an annular connection region, to a housing, and
   wherein the abutment region and the connection region are connected to one another using at least one elastically deformable hinge region.

7. The seal of claim 1, wherein the counterpart ring is accommodated by a support body, and
   wherein the support body includes an axial projection configured to press onto a shaft.

8. The seal of claim 7, wherein a region of the axial projection has a frustoconical cross section, such that an interior space of the axial projection runs conically.

9. The seal of claim 7, wherein the spring element includes a radial lip which bears against the slide ring, and
   wherein the radial lip has the same inner diameter as, or a larger inner diameter than, the support body.

10. The seal of claim 7, wherein the spring element includes a radial lip which projects at an angle from the slide ring, and
    wherein the radial lip has the same inner diameter as, or a larger inner diameter than, the support body.

11. The seal of claim 7, wherein the spring element includes a dust lip which bears against the abutment region, and
    wherein the dust lip has the same inner diameter as, or a larger inner diameter than, the support body.

12. The seal of claim 7, wherein the spring element includes a dust lip which bears against the connection region, and
    wherein the dust lip has the same inner diameter as or a larger inner diameter than the support body.

13. The seal of claim 7, wherein a gap is formed between the axial projection and the counterpart ring.

14. The seal of claim 7, wherein the axial projection extends in an axial direction to such an extent that the axial projection also runs under the slide ring.

15. The seal of claim 1, wherein a quotient of
    a first circular-ring-shaped area, which faces toward the spring element, on the slide ring and
    a projected, second circular-ring-shaped area, which extends between an abutment region of the spring element against the slide ring and a connection region of the spring element to a housing (10),
    is selected such that a second force acting on the projected, second circular-ring-shaped area axially in a direction of the slide ring is between 1% and 100,000% of a first force which acts on the first circular-ring-shaped area axially in a direction of the counterpart ring.

16. The seal of claim 1, wherein the spring element is surrounded at least partially in an axial and/or radial direction by a wall.

17. The seal of claim 16, wherein the wall is a part of a support body in which the counterpart ring is accommodated.

18. The seal of claim 1, having a gas-type lubrication arrangement.

19. The seal of claim 1, wherein the slide ring sealing surface and/or the counterpart ring sealing surface include hydrodynamic structures.

20. A crankshaft of an internal combustion engine, comprising the seal of claim 1.

* * * * *